United States Patent [19]

Rossow

[11] Patent Number: 5,233,865
[45] Date of Patent: Aug. 10, 1993

[54] PROBE SYSTEMS FOR MEASURING STATIC PRESSURE AND TURBULENCE INTENSITY IN FLUID STREAMS

[75] Inventor: Vernon J. Rossow, Los Altos, Calif.

[73] Assignee: The United States of America as represented by the Administrator of the National Aeronautics and Space Administration, Washington, D.C.

[21] Appl. No.: 690,440

[22] Filed: Apr. 24, 1991

[51] Int. Cl.$^5$ ............................ G01F 1/46; G01P 5/165
[52] U.S. Cl. ..................................... 73/147; 73/861.65
[58] Field of Search ..................... 73/147, 182, 861.65, 73/861.66, 861.67

[56] References Cited

U.S. PATENT DOCUMENTS

| 2,923,152 | 2/1960 | Mabry, Jr. et al. | 73/182 X |
| 3,646,811 | 3/1972 | DeLeo et al. | 73/861.65 X |
| 4,718,273 | 1/1988 | McCormack | 73/180 |
| 4,730,487 | 3/1988 | DeLeo et al. | 73/861.65 X |
| 4,836,019 | 6/1989 | Hagen et al. | 73/861.65 X |

FOREIGN PATENT DOCUMENTS 2142439 1/1985 United Kingdom ................... 73/147

OTHER PUBLICATIONS

"Probe Shapes That Measure Time-Averaged Streamwise Momentum and Cross-Stream Turbulence Intensity" U.S. Government, NASA Ames Research Center, V. J. Rossow, pp. 2-28 and FIGS. 1-13.
"Applied Hydro-and Aeromechanics" O. G. Tietjens, Engineering Societies Monographs 1934, pp. 226-235.
Luftfahrtforschung, vol. XII, No. 2, May 16, 1935, Technical Memorandums National Advisory Committee for Aeronautics, No. 775, "Total-Head Meter with Small Sensitivity to Yaw" by G. Kiel, pp. 1-6, FIGS. 1-13.
Technical Notes, National Advisory Committee for Aeronautics, No. 546, "Comparative Tests of Pilot--Static Tubes", by Kenneth G. Merriam et al., Nov. 1935, pp. 1-5 and 32.
"A Note on the Measurement of Total Head and Static Pressure in a Turbulent Stream", S. Goldstein, pp. 570-575.
"Considerations Entering into the Selection of Probes for Pressure Measurement in Jet Engines", C. C. Gettelman et al., Instrument Society of America, Aeronautic Inst. Session 11, Paper No. 52-12-1, pp. 134-137.
"On the Static Pressure in Fully-Developed Turbulent Flow", A. Page, Proc. Roy. Society of London, Series A, vol. 155, Jul. 1, 1936, pp. 576-596.
National Advisory Committee for Aeronautics, ACR No. 3L23, Wartime Report, "Investigation of Flow in an Axially Symmetrical Heated Jet of Air", S. Corrsin, pp. 1-34 and FIGS. 1-43.
"Response of Pitot probes in turbulent streams", H. A. Becker et al., J. Fluid Mech. (1974), vol. 62, part 1, pp. 85-114.

Primary Examiner—Herbert Goldstein
Attorney, Agent, or Firm—Darrell G. Brekke; Guy Miller; John R. Manning

[57] ABSTRACT

A method and apparatus for measuring time-averaged static or ambient pressure and turbulence intensity in a turbulent stream involve placing a plurality of probes in the stream. Each probe responds in a different manner to characteristics of the fluid stream, preferably as a result of having varying cross sections. The responses from the probes are used to eliminate unwanted components in the measured quantities for accurate determination of selected characteristics.

50 Claims, 8 Drawing Sheets

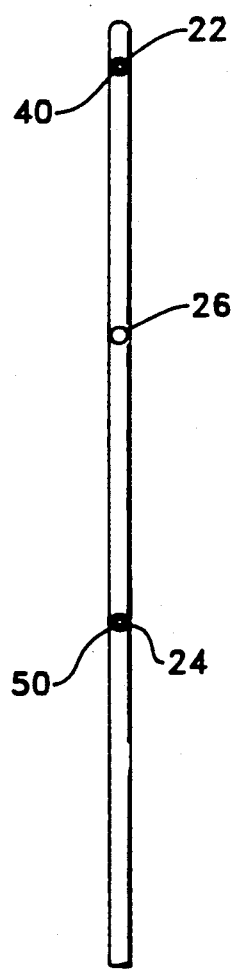
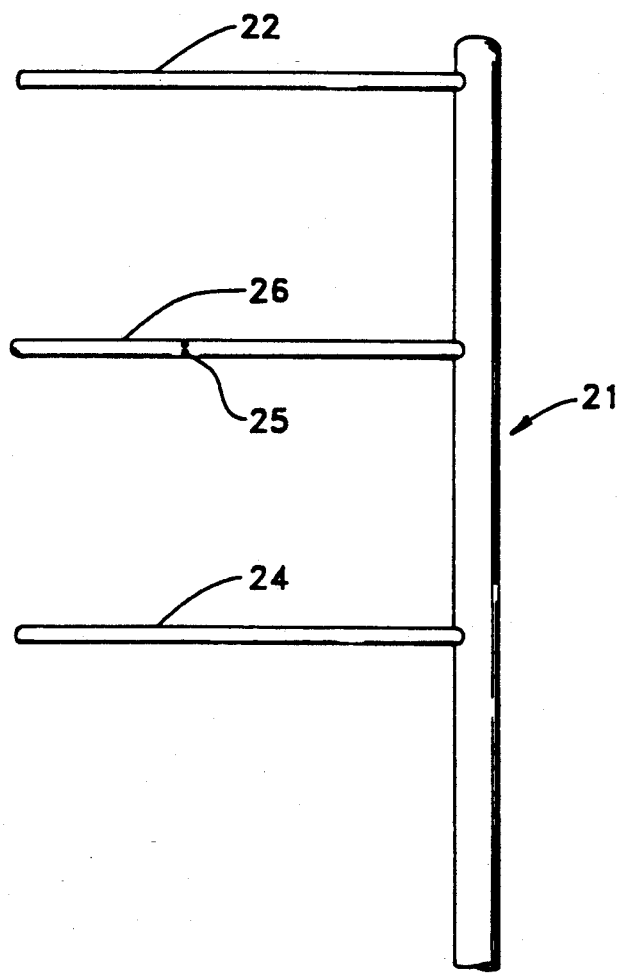

PROBE SYSTEMS FOR MEASURING STATIC PRESSURE AND TURBULENCE INTENSITY IN FLUID STREAMS

ORIGIN OF THE INVENTION

The invention described herein was made by an employee of the U.S. Government and may be manufactured and used by or for the Government without the payment of any royalties thereon or therefor.

BACKGROUND OF THE INVENTION

The present invention is directed to pressure measuring probe systems and, more particularly, to probe systems for use in highly turbulent fluid streams that measure time-averaged static or ambient pressure and turbulence intensity.

The static or ambient pressure in a fluid stream is defined as the pressure that would be sensed if an observer or instrument were to move with the local stream direction and velocity, i.e., float along with an element of the fluid. Since it is usually impractical to have a pressure sensing device float along with a local stream element, it has been common practice to use a tubular probe having orifices in its side, the probe pointing into the stream direction. The location of the orifices is such that, when the flow is steady, they sense the local static pressure. Such a technique provides a reliable measurement for the ambient pressure because the probe is designed to cause negligible distortion to the local pressure field at the location of the orifices in the side of the tubular probe.

When the flow is unsteady or turbulent, a tubular probe can no longer be aligned with the local streamline direction at all times because the flow direction is changing continuously. Turbulent velocity fluctuations then cause significant pressure variations at the orifices in the probe. Under those circumstances, the instantaneous flow has a velocity component across the probe axis a large portion of the time. When the fluid flows across or around a tube, the local pressure field is often strongly perturbed by the presence of the tube. Hence, not only is an average of the static pressure required over time, but the pressure measured at the orifices is not clearly related to the actual local static pressure which would exist in the absence of the probe. It would be preferable to design a probe so that the unwanted contributions to pressure due to the unsteady cross-flow would be negligible, as they are in a steady stream, thereby enabling direct measurement. It is very difficult to design a probe such that unwanted contributions are not registered, because the sides of the probe would have to be parallel to the local stream direction or ride along with the fluid.

A wide variety of probe shapes, as shown in FIGS. 1A-1H, have been used to measure the static or ambient pressure in both laminar and turbulent streams. FIG. 1A illustrates the Prandtl probe 100 (Prandtl et al., Applied Hydro- and Aeromechanics, McGraw Hill Book Co., Inc., 1934) which is imbedded in the stream and which is capable of making both a total head and a static pressure measurement. The probe has a hemispherical nose 102 with an orifice 104 connected to an axial duct 104' on the centerline for measurement of stagnation pressure. In order to measure the static pressure on the same streamline, the probe has a ring of orifices 106 through the side walls of the tube located about five diameters downstream of the nose, which are connected to an axial, annular duct 106'. Prandtl also made recommendations for the design of the installation so that the effects of the probe and its support on the measurements are minimized. The Prandtl probe yields results accurate to within several percent when its inclination to the flow is small, but significant error develops in the measurement of both static and total pressure if the flow angle relative to the probe axis is larger than about 10°. The pressure at the static orifices is thus sensitive to the cross-flow that occurs when mean flow incidence and/or velocity fluctuations are present.

The wedge-shaped static probe 110 illustrated in FIG. 1B and described by Gettelman & Krause (Gettelman et al., "Characteristics of a Wedge with Various Holder Configurations for Static-Pressure Measurements in Subsonic Gas Streams", NACA RM E51G09, 9/1951) and the disk-shaped static probe 130 illustrated in FIG. 1D and described by Walshe (Walshe et al., "Usefulness of Various Pressure Probes in Fluctuating Low-Speed Flow", British Aeronautical Research Council Report No. 21,714, F.M. 2917, 2/1960) were designed to approximate a portion of a wall wherein the velocity component parallel to the wall does not cause a serious problem. The lift distribution on these winglike shapes, however, varies considerably with the cross-flow component perpendicular to the flat surfaces of the probe. On occasion it is found that pressures are even affected by the mounting sting or tube because it modifies the Kutta condition on the circular plate. For these reasons, the errors at the orifices 112 and 132 on the two flat surfaces of the probe (which are connected to axial ducts 112' and 132', respectively) do not usually compensate for one another for even small angles of incidence.

The slender cone static probe 120 illustrated in FIG. 1C and described by Huey (Huey, "A Yaw-Insensitive Static Pressure Probe", Journal of Fluids Engineering, Transaction of the ASME, Vol. 100, pp. 229-31, June 1978) has orifices 122 on the conical surface spaced at several meridian angles and connected to an axial duct 122'. This probe design assumes that flow angularity affects the pressures sensed on opposite sides of the cone in a way that provides automatic compensation. Flow across the circular cross section of the probe does, however, generate low pressures on both sides of the tube that are not compensatory.

FIG. 1E illustrates a static probe 140 having various possible cross-sectional shapes as shown by way of example in FIGS. 1F and 1G. Probe 140 has orifices 141 through its side walls connected to an axial duct 141'. The rounded-square shape 142 and the rounded-diamond shape 144, respectively illustrated in FIGS. 1F and 1G, were designed in accordance with a sophisticated design technique by Smith and Bauer (Smith et al., "Static-Pressure Probes That are Theoretically Insensitive to Pitch, Yaw and Mach Number," Journal of Fluid Mechanics, Vol. 44, Pt. 3, pp. 513-28, January 1970) and perform satisfactorily up to angles of incidence of about 10°.

The slotted sphere static probe 150 illustrated in FIG. 1H and described by Blackmore (Blackmore, "A Static Pressure Probe for Use in Turbulent Three-Dimensional Flows", Journal of Wind Engineering and Industrial Aerodynamics, Vol. 25, pp. 207-18, 1987) is also the result of a refined effort and is effective up to flow angles of around 20°. The main element of the probe is a hollow sphere 152 having orthogonally arranged slots 154 that each subtend an angle of 110 degrees and are connected through the sphere to a duct 154'. The probe is not, however, easy to construct. Furthermore, highly turbulent flow fields require a wider range of incidence angles if the interpretation of the probe measurements is to be unrestricted and uncomplicated.

Another approach that has been used to determine static and stagnation pressures is to accept the measurement produced by a given probe and then interpret the results by means of an analysis to calculate the actual desired values. This approach would yield a true indication of the desired pressure if the proper analytical relationship could be found to account for such items as the probe shape, orifice design, stream turbulence, flow angularity, flow unsteadiness, etc., and thereby relate the measured quantities to the true pressures. Some probes yield values for the desired pressures with negligible corrections and others require that the data undergo considerable processing. The devices preferred are those that have the smallest need for correction because the technique required for analysis of the data is not always apparent. For example, it was found by Bradshaw and Goodman (Bradshaw et al., "The Effect of Turbulence on Static-Pressure Tubes," British Aeronautical Research Council Report No. 3527, September 1966) that data taken with Prandtl probes of various sizes to determine the static pressure in various jet flow fields yielded results that were greater or less than the true static pressure depending on the diameter of the probe. A relationship between the measured and actual values was not found.

Another more conventional approach is to measure the time-dependent velocities with devices such as a hot-wire probe or a Laser Velocimeter (LV), and then work out an analysis of how the pressure and velocity fluctuations are related to the measurements and to the probe design. These methods provide more information on the details of the stream than do pressure probes, but also require an extensive amount of equipment which must be carefully tuned and calibrated by experienced staff.

The research of Becker and Brown (Becker et al., "Response of Pitot Probes in Turbulent Streams", Journal of Fluid Mechanics, Vol. 62, Pt. 1, pp. 85-114, 1974) prompted the development of a new probe shape for the measurement of total head based on the streamwise component of the velocity. Their investigation accepts measurements by a probe or probes and then interprets the measurements by means of an analysis. Becker and Brown processed the total head measurements from two differently shaped probes to determine the turbulence level and the impact pressure distribution in a jet stream.

Cho and Becker (Cho et al., "Response of Static Pressure Probes in Turbulent Streams", Experiments in Fluids, Vol. 3, pp. 93-102, 1985) applied the same type of analysis as used by Becker and Brown for the determination of static pressure in a turbulent stream. In that study, the pressure measurement at a single static pressure orifice on a round probe is used to determine the time-averaged static pressure. The measurement is related by an analysis to estimate the true time-averaged static pressure. Their methods are complicated and require assumptions as to the nature of the turbulence in the flow field and as to its interaction with the probes used in the measurements. The use of a single measurement further does not provide for any redundancy in the final determination of the time-averaged static pressure and therefore lacks reliability.

U.S. Pat. No. 2,923,152 to Mabry, Jr. et al. discloses a five-prong aerodynamic pickup wherein at least three air flow variables can be detected using a single pickup. The pickup has a total pressure probe, two sideslip probes and two angle of attack probes, the probes all having the same dimensions. Signals from the pickup are routed to the cockpit of an airplane.

U.S. Pat. No. 4,184,149 to Baker et al. discloses a single air speed and attitude probe wherein only total pressure and static pressure are determined. The probe has a tubular body. A static pressure transducer and a total pressure transducer are supported within the probe body.

U.S. Pat. No. 4,833,917 to Wilson discloses a three component velocity probe for large scale applications wherein three sensing holes of the same dimension are located on one probe. The arrangement allows a three dimensional representation of a velocity field to be calculated. The probe detects static pressure as well as total pressure.

While several attempts have been made to design probes that are insensitive to the angle of incidence and to turbulence fluctuations, including the design of specially shaped probes, the probes are difficult to build. Thus, a very limited amount of testing of the designs has been carried out. The unusual probe shapes make data interpretation complicated. The probes have had limited success at larger angles of incidence, and thus do not perform well in a turbulent stream.

SUMMARY OF THE INVENTION

One object of the present invention is to provide a probe system which provides a true time-averaged static or ambient pressure measurement even in turbulent streams.

Another object of the present invention is to provide a probe system which eliminates undesirable contributions to the static pressure measurement.

Another object of the present invention is to provide a probe system which accurately monitors significant flow field characteristics.

A further object of the present invention is to provide a probe system which is easily assembled and operated.

To achieve the foregoing and other objects and advantages, and to overcome the shortcomings discussed above, several probe systems are provided which accurately determine the time-averaged static pressure in a turbulent fluid stream. The system utilizes the interaction of velocity fluctuations with the probes to enhance the detection of pressure variations within the turbulent stream. The system evaluates a variety of parameters, each probe either amplifying or suppressing specific aspects of a turbulent velocity field. The information obtained with the probes may be used to eliminate unwanted components in the measured quantities for the determination of the true time-averaged static pressure, turbulence intensities, stagnation pressures and/or various other flow parameters characterizing a turbulent stream.

BRIEF DESCRIPTION OF THE DRAWINGS

The invention will be described in detail with reference to the drawings in which like reference numerals refer to like elements and wherein:

FIGS. 3A, 3B and 3C are front, side and top views, respectively, of a second probe system composed of three tubes of circular cross section, two of which are stagnation probes and one of which is a static pressure probe, the combination of which measures both time-averaged static pressure and cross-stream turbulence;

DETAILED DESCRIPTION OF PREFERRED EMBODIMENTS

Figure 1A:
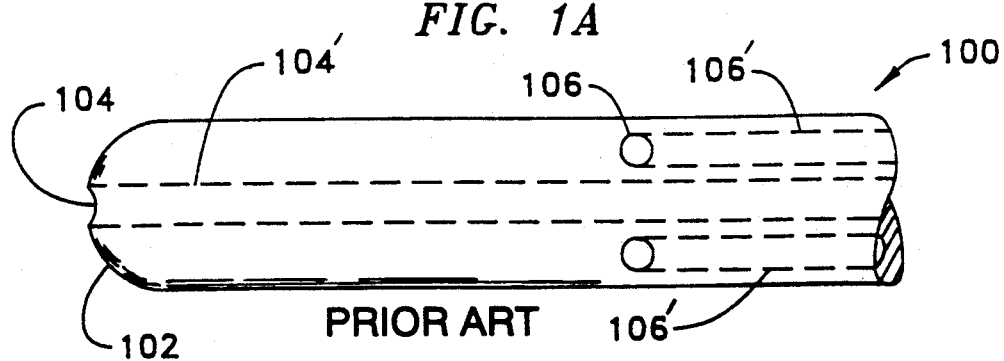
FIGS. 1A-1H illustrate known probe shapes used to measure static pressure.
Figure 1B:
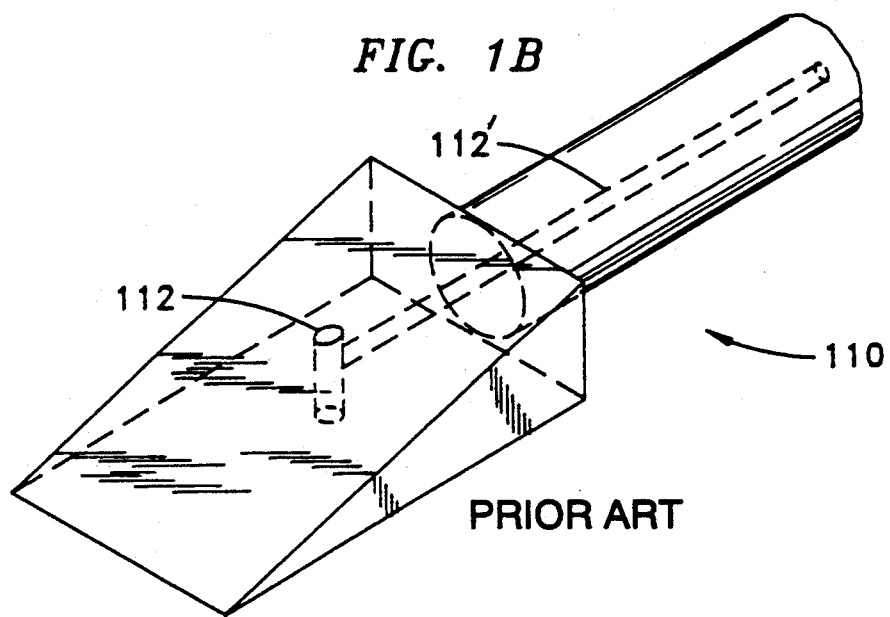
Figure 1C:
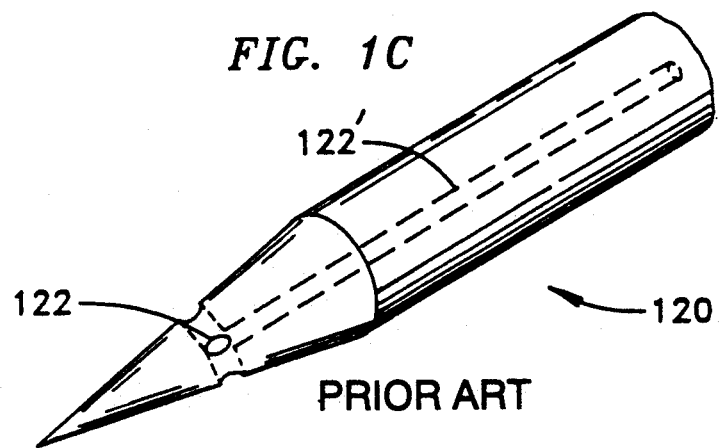
Figure 1D:
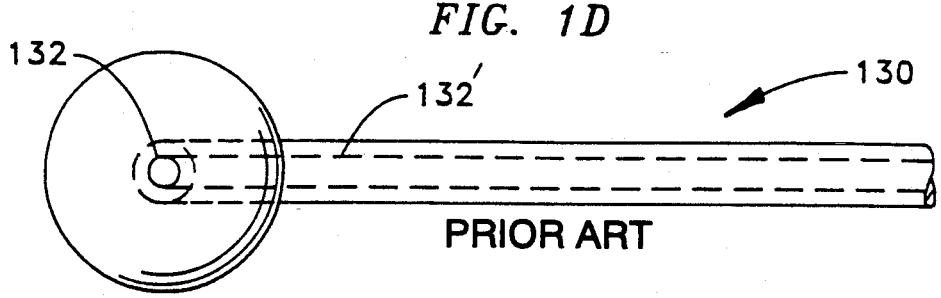
Figure 1E:
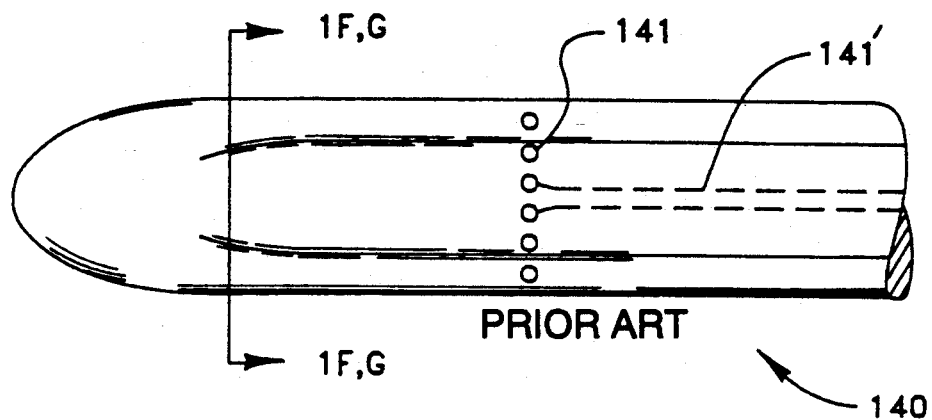
Figure 1F:
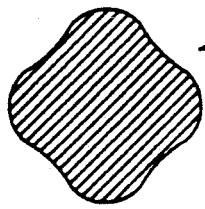
Figure 1G:
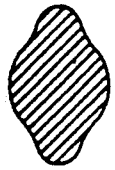
Figure 1H:
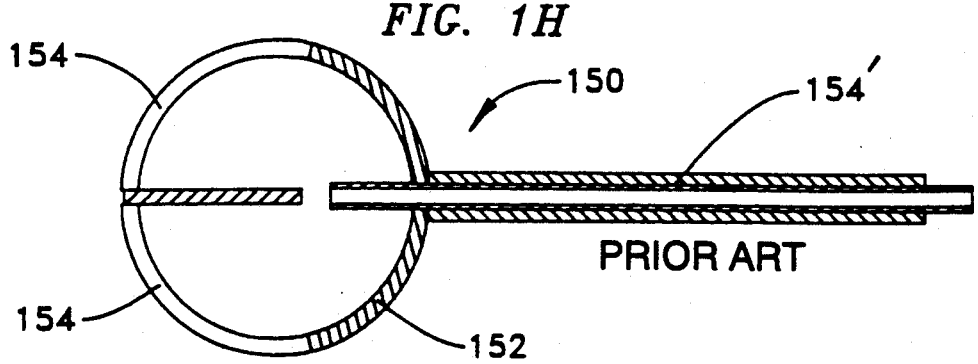

In accordance with the present invention, a probe system is provided which gathers enough information to accurately determine the time-averaged static pressure in a turbulent fluid stream. The system includes a group of probes, each of which either amplifies or suppresses specific aspects of a turbulent velocity field. Each probe evaluates a given quantity or pressure in the turbulent stream to arrive at not only an overall true time-averaged static pressure measurement but also an evaluation of the cross-stream turbulence components. The information obtained with the probes may be used to eliminate unwanted components in the measured quantities for the determination of the true time-averaged static pressure, turbulence intensities, stagnation pressures and/or various other flow parameters characterizing a turbulent stream.

The system comprises several probes supported on a member such as a rod, at least one of the probes having one or more orifices in the sides thereof. Each probe has a nose and an afterbody. The probes preferably have their axes or centerlines aligned with the time-averaged direction of the oncoming stream so that the measured pressures will not have a steady-state component induced by the steady cross-flow velocity. The probes should be sufficiently long that the static pressure orifices in the sides of the probes are located at least five diameters or major axis lengths from the nose of the probe and at least ten rod diameters from the support rod. The probes are spaced around the point where measurements are desired at five or more diameters apart so that the pressure field of one probe does not produce a measurable pressure increment on any other probe. The probe and support rod surfaces are preferably smoothly streamlined so that flow separation or other flow disturbances are not produced as the stream flows over the nose, afterbody and support rod of the system. The orifices in the sides of the probes have smooth openings into a duct passing through the length of the probe to pressure sensing elements which make a quantitative evaluation of the pressure. The orifice diameter preferably does not exceed 10% of the minor dimension of the probe to avoid pressure influences from other parts of the probe shape. When elliptical probes are used, the axis ratio of the cross section of the probes is at least two and preferably not much in excess of four to ensure that sufficient velocity enhancement occurs and yet that excessive flow separation on the downstream side of the probe does not occur.

The following nomenclature is used in the present disclosure:

H = stagnation pressure or total head
$\hat{i},\hat{j},\hat{k}$ = unit vectors in x,y,z directions
p = instantaneous value of static pressure
q = dynamic pressure = $\rho \bar{U}^2/2$
r = radius
t = time
u = fluctuating part of velocity component in stream direction
U = instantaneous value of local velocity in stream direction
$\bar{U}$ = time-averaged velocity in stream direction
v = fluctuating part of velocity component in lateral direction
V = instantaneous value of local velocity
w = fluctuating part of velocity component in vertical direction
x = distance in streamwise direction
y = distance in lateral direction
z = distance in vertical direction
$\alpha$ = angle of pitch
$\beta$ = yaw angle
$\epsilon$ = fineness ratio of ellipse = major axis/minor axis
$\theta$ = meridian angle
$\rho$ = air density Subscripts c = cylinder
circ = probe with circular cross section
e = based on entire instantaneous local velocity
orif = orifice
x = based on x component of velocity
y = based on y component of velocity
z = based on z component of velocity Note: a bar over any value (e.g., $\bar{U}$ above) indicates a time-averaged value.

The equations that describe the changes in pressure to be expected at orifices in the sides of probes of several different shapes are set forth below and were used in designing probe systems that will provide measurements for the determination of static pressure. The turbulent stream in which a measurement is to be made is assumed to have, at least locally, a direction that is, on the average, aligned with the x-axis and whose time-averaged magnitude is given by $$\bar{U} = \frac{1}{\Delta t} \int_0^{\Delta t} V dt \tag{1}$$

where $\Delta t$ is assumed to be a time interval sufficiently long that the magnitude of the averaged quantity does not change if $\Delta t$ is increased. The components of the instantaneous values of the fluctuations of the velocity about this value due to the turbulence in the stream are labeled u, v, and w which are taken to be aligned with the x, y, and z axes, respectively. If the velocity fluctuations vanish, the total head is given by the sum of the static pressure, p, and the dynamic pressure, $$\frac{\rho}{2} \overline{U}^2,$$

for the total head, H, as given by Bernoulli's equation for incompressible flow $$H = p + \frac{\rho}{2} \overline{U}^2.$$

When the flow field is turbulent, it is necessary to keep track of the various parts of the stream characteristics. For this purpose, a notation is used to define and relate the various pressure magnitudes. The instantaneous total or entire stagnation pressure, $H_e$, is based on the local instantaneous static pressure, p, and the entire instantaneous local velocity, V, as given by $$H_e = p + \frac{\rho}{2} V^2 = p + \frac{\rho}{2} [(\overline{U} + u)^2 + v^2 + w^2] \quad (2)$$

Similarly, the instantaneous value for the total head based on static pressure and the streamwise or x-component of the velocity is given by $$H_x = p + \frac{\rho}{2} (\overline{U} + u)^2 \quad (3)$$

The difference between the two time-averaged pressures expressed by Eqs. (2) and (3) eliminates the static pressure and the x component of velocity to yield $$(\overline{H}_e - \overline{H}_x)/q = (\overline{v^2} + \overline{w^2})/(\overline{U}^2 \quad (4)$$

where $q = \rho \overline{U}^2/2$.

By use of the specially shaped probes described in copending U.S. patent Application 07/660,473 filed Feb. 21, 1991, the disclosure of which is incorporated by reference herein, the difference between the time average of the two total head quantities in Eq. (4) yields the sum of the squares of the two cross-stream turbulence intensities.

Similar arguments are used to develop the relationships needed for a probe system that will provide enough information to obtain a reliable measurement of the time-averaged static pressure $\overline{p}$. The first step is to derive a theoretical expression for the response to flow incidence of a standard Prandtl pitot-static probe illustrated in FIG. 1A. Since the probe has a circular cross section and since the static pressure orifices are quite far from the nose of the probe (at least 5 diameters), the cross-flow is approximated by two-dimensional time-dependent considerations. An estimate is first made of the effect of the presence of a tubular probe on the pressure by assuming that the flow over the cylinder is steady. Based on potential flow theory, the static pressure on the cylinder is given by $$H_e = p + \frac{\rho}{2} V^2 = p + \frac{\rho}{2} [(\overline{U} + u)^2 + (v^2 + w^2)(4\sin^2\theta)] \quad (5)$$

The term containing ($4 \sin^2\theta$) adjusts the magnitude of the cross-stream velocity (and thereby the pressure) for the influence of the probe on the pressure at each of the orifices located at the meridian angle $\theta$. The meridian angle $\theta$ is taken to be zero in the plane that contains the windward stagnation point. The difference between the local static pressure, p, and the pressure at a given orifice, $P_{orif}$, is found by subtracting Eqs. (2) and (5). If the probe being used to measure the static pressure has a very large number of static orifices (so that the pressure is essentially monitored on a continuous basis with meridian angle), the average deviation of the measured static pressure from the actual value is found by integration with respect to $\theta$ around the probe to yield $$(p_{orif} - p) = -\frac{\rho}{2} (v^2 + w^2) \quad (6)$$

The integration over $\theta$ is made before the time-averaging process because it is assumed in the present simple approach that the pressure at the orifices is in equilibrium at each instant of time. When the time-average is taken and Eq. (4) is used, three measured pressures are related to the time-averaged static pressure by $$\frac{(\overline{p}_{orif} - \overline{p})}{q} = -\frac{(\overline{v^2} + \overline{w^2})}{\overline{U}^2} = -\frac{(\overline{H}_e - \overline{H}_x)}{q} \quad (7)$$

The same applies to probes that have four static orifices spaced at 90° intervals around the tube being used as the static probe regardless of the meridian angle of the oncoming cross-flow direction. Hence, four, eight, or twelve orifices equally spaced around the probe all yield the same result as given by Eq. (7).

It is desirable that measurements be made of the static pressure by different means so that redundant values can be obtained. One way to obtain more measurements in the turbulent stream is to design the probe so that it emphasizes a component of the cross-flow. The present invention preferably utilizes probes of different cross sections to emphasize by a predictable amount the cross-flow dynamic pressures in order to make them easier to measure. Hence, one element of an alternate exemplary probe system includes a probe of elliptical cross section which has its major axis perpendicular to the y axis. That probe amplifies the pressure variations due to velocity fluctuations in the y direction. Similarly, a probe of elliptical cross section can be placed so that it has its major axis perpendicular to the z axis to emphasize pressure variations due to velocity fluctuations in the z direction. In order that each elliptically shaped probe does in fact emphasize or amplify its particular component of the cross-flow, static pressure orifices may be located only at the two extremities of the major axis at about 5 major axis lengths from the nose of the probe. Since the amount of amplification is governed by the fineness or axis ratio (major/minor axis), it should preferably be greater than two and not much in excess of four. Figures in this range provide ample enhancement but will not be so large that extensive flow separation occurs on the leeward side of the probe. Orifices located elsewhere, such as at the ends of the minor axis, provide a pressure signature that amplifies the pressure fluctuations by only a small amount.

Based on steady inviscid flow around a probe of elliptical cross section, the pressure, $p_y$, at orifices located on the extremities of the elliptical probe used to measure fluctuations in the velocity along the y axis is related to the instantaneous velocity at those orifices by Bernoulli's equation. Subtraction of Bernoulli's equation for the flow in the absence of the probe yields an expression for the pressure at the orifices located at the ends of the major axis as $$(p_y - p) = \frac{\rho}{2}[V^2 - (\bar{U} + u)^2 - v^2(1 + \epsilon_y)^2]$$

where p is the instantaneous local static pressure. After combination of terms and time averaging, the foregoing equation may be rewritten as $$\frac{(\bar{p}_y - \bar{p})}{q} = \frac{(\overline{v^2} + \overline{w^2})}{\bar{U}^2} - \frac{\overline{v^2}}{\bar{U}^2}(1 + \epsilon_y)^2 \quad (8)$$

where $\epsilon_y$ is the axis ratio of the elliptical probe used to measure the y component of the turbulence. In this case, the major axis of the ellipse is assumed to be aligned with the vertical or z axis in order to emphasize the lateral component of the fluctuating velocity.

Similarly, the w-component of turbulence may be emphasized in a pressure measurement made by use of a probe of elliptical cross section which has its major axis oriented in the horizontal plane along the y axis. The corresponding time-averaged static pressure at two orifices located at the extremities of the major axis is given by $$\frac{(\bar{p}_z - \bar{p})}{q} = \frac{(\overline{v^2} + \overline{w^2})}{\bar{U}^2} - \frac{\overline{w^2}}{\bar{U}^2}(1 + \epsilon_z)^2 \quad (9)$$

where $\epsilon_z$ is the fineness ratio of the elliptical probe with its major axis perpendicular to the z axis. The pressures at the orifices on the major axis of the two elliptical probes are enhanced by the square of the product of the cross-stream velocity component and the ellipticity of the probe.

Eqs. (8) and (9) also apply to a probe setup wherein the elliptical probes have their minor axes perpendicular to the velocity components being considered. If such an arrangement of probes is used, the pressure sensed at orifices located on the extremities of the minor axis is only slightly perturbed by the ellipsoidal shape, i.e., $\epsilon < 1$. The primary contribution to the pressure at the orifices is then given approximately by the impact pressure of the other transverse component of velocity fluctuations, i.e., setting $\epsilon_y$ and $\epsilon_z$ equal to zero in Eqs. (8) and (9). Although such an arrangement presents another way for making measurements for the determination of the time-averaged static pressure, location of the orifices on the ends of the major axis is preferred because that configuration enhances the pressure fluctuations so that they become more significant and, therefore, easier to measure. Also, pressure orifices located at the downstream or leeward ends of the minor axis are much more likely to be influenced substantially by flow separation effects than orifices located at the ends of the major axis.

By use of the equations derived above, several probe systems according to the present invention can be derived that gather enough information to determine the time-averaged static pressure in a turbulent stream. In the various arrangements discussed herein, it is assumed that the turbulence in the flow field is homogeneous over a region large enough to envelop the probe system and that the gradients are small enough that the flow field characteristics do not change appreciably across the largest distance between probes. If such is the case, each probe in a given system encounters (when averaged over time) an equivalent flow field even though the individual probes may be experiencing a different eddy at a given instant of time. It is also assumed that the flow around one probe does not measurably affect the flow field in the vicinity of the orifices of any other probe in the system. Hence, variations in pressure at the orifices of the various probes may not be synchronized because their spacing is larger than some of the eddy sizes, but the time-averaged pressures each yield a representative value for the local flow field. When the elements in the flow field associated with the velocity fluctuations, or the eddies, are smaller than a probe diameter, the pressure signals impressed at the various orifices will respond in a way that is not represented by the equations presented here. Nevertheless, the probes pick up the pressure variations of the eddies that are on the order of the probe diameter or larger, which usually include the most energetic part of the turbulence.

Insertion into a turbulent stream of a single tubular probe of circular or elliptical cross section yields information on the static pressure at that location. However, the fluctuating cross-flow over the probe due to turbulence reduces the pressure at the orifices by an amount that depends on the cross-sectional shape of the probe and on the magnitude of the cross-flow velocity (see Eqs. (7)–(9)). Since the characteristics of the cross-flow velocity fluctuations are not known, additional information is needed to find the time-averaged static pressure. As mentioned previously, the present invention obtains the needed information by inserting additional probes into the flow field in the vicinity of the point of interest until enough information is available to determine the flow-field characteristics. The quantities in Eqs. (7)–(9) that are to be measured so that the time-averaged static pressure can be determined are used as a basis for placing the various probe shapes into a given cluster.

One probe system that can be used in accordance with the present invention is illustrated in FIGS. 2A–2D. The probe system 10 provides sufficient information to determine the time-averaged static pressure, and comprises an assembly of one circular probe 12 and two elliptical probes 14 and 16 aligned with the time-averaged stream direction and supported on rod 18. For illustrative purposes, probe 12 has four pressure orifices 15 (two shown and two hidden), probe 14 has two pressure orifices 15 at the extremities of its major axis as shown, and probe 16 has two pressure orifices 15 at the extremities of its major axis (one shown and one hidden). Of course, circular probe 12 may have additional pressure orifices, four, eight or twelve orifices being preferred. Two orifices are preferred for each of probes 14 and 16 as shown and described. The pressure orifices 15 in all three probes are located in the sides of the probes 12, 14 and 16 at the same streamwise station and at the same distance from the nose 20 of each probe. One of the probes (e.g., probe 14) of elliptical cross section has its major axis perpendicular to the y axis, and the other probe of elliptical cross section (e.g., probe 16) has its major axis perpendicular to the z axis.

Since probe 14 has its largest or major axis facing any flow along the y coordinate axis, the pressure field associated with velocity fluctuations at the orifices located at the extremities of the major axis is amplified by approximately the square of the fineness ratio of the elliptical cross section of the probe 14. Probe 16 has its smallest or minor axis aligned with the y coordinate axis perpendicular to the time-averaged streamwise direction so that the major axes of probes 14 and 16 are perpendicular to one another. The pressure field associated with those velocity fluctuations at orifices located at the extremities of the major axis is amplified by approximately the square of the fineness ratio of the elliptical cross section of the probe 16. The two probes 14 and 16 of elliptical cross section thus provide information on the two components of flow across the probe axis (the time-averaged x direction of the stream) and on the time-averaged static pressure.

Figure 2C:
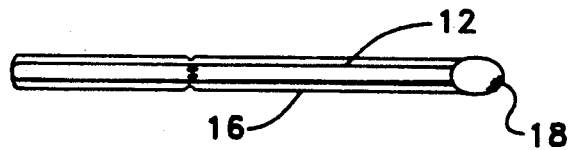
FIGS. 2A, 2B and 2C are front, side and top views, respectively, of a probe system for providing redundant measurements of time-averaged static pressure, composed of two tubes of elliptical cross section and one tube of circular cross section arranged to emphasize the cross components of turbulence.
Figure 2A:
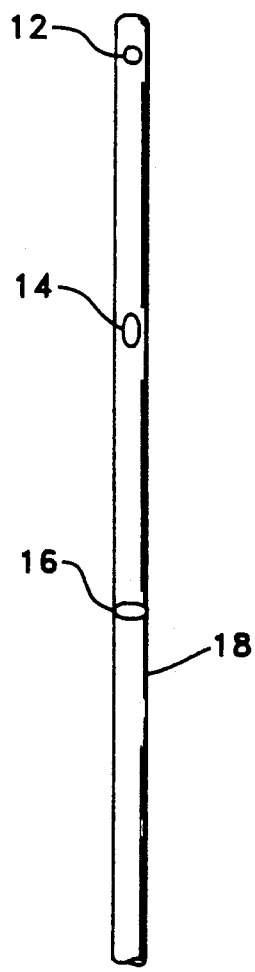
Figure 2B:
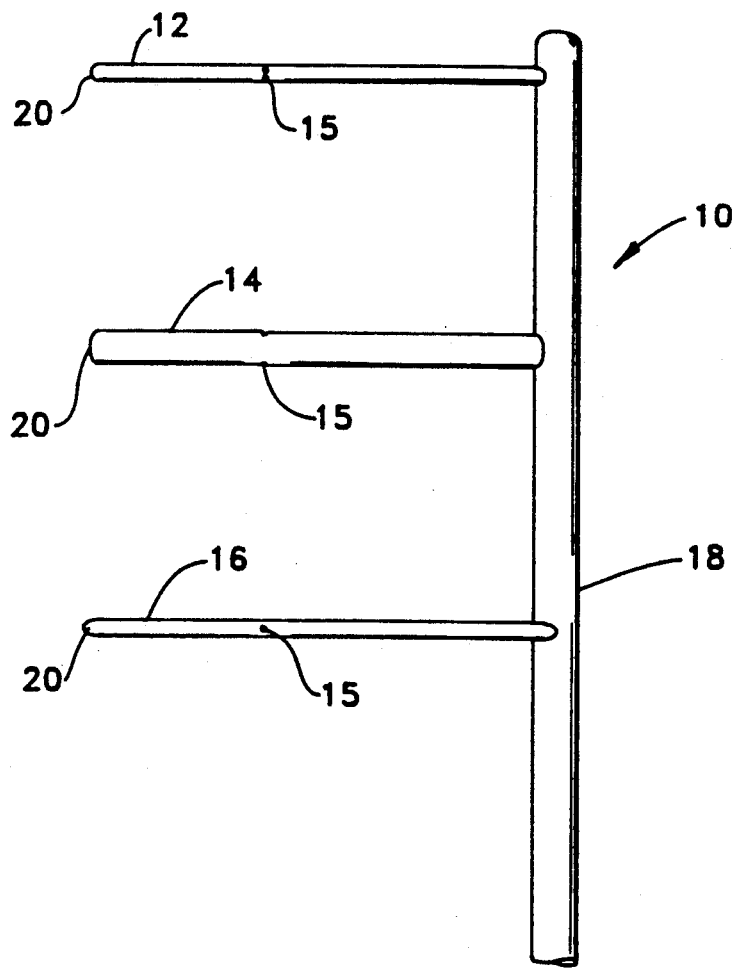
Figure 2D:
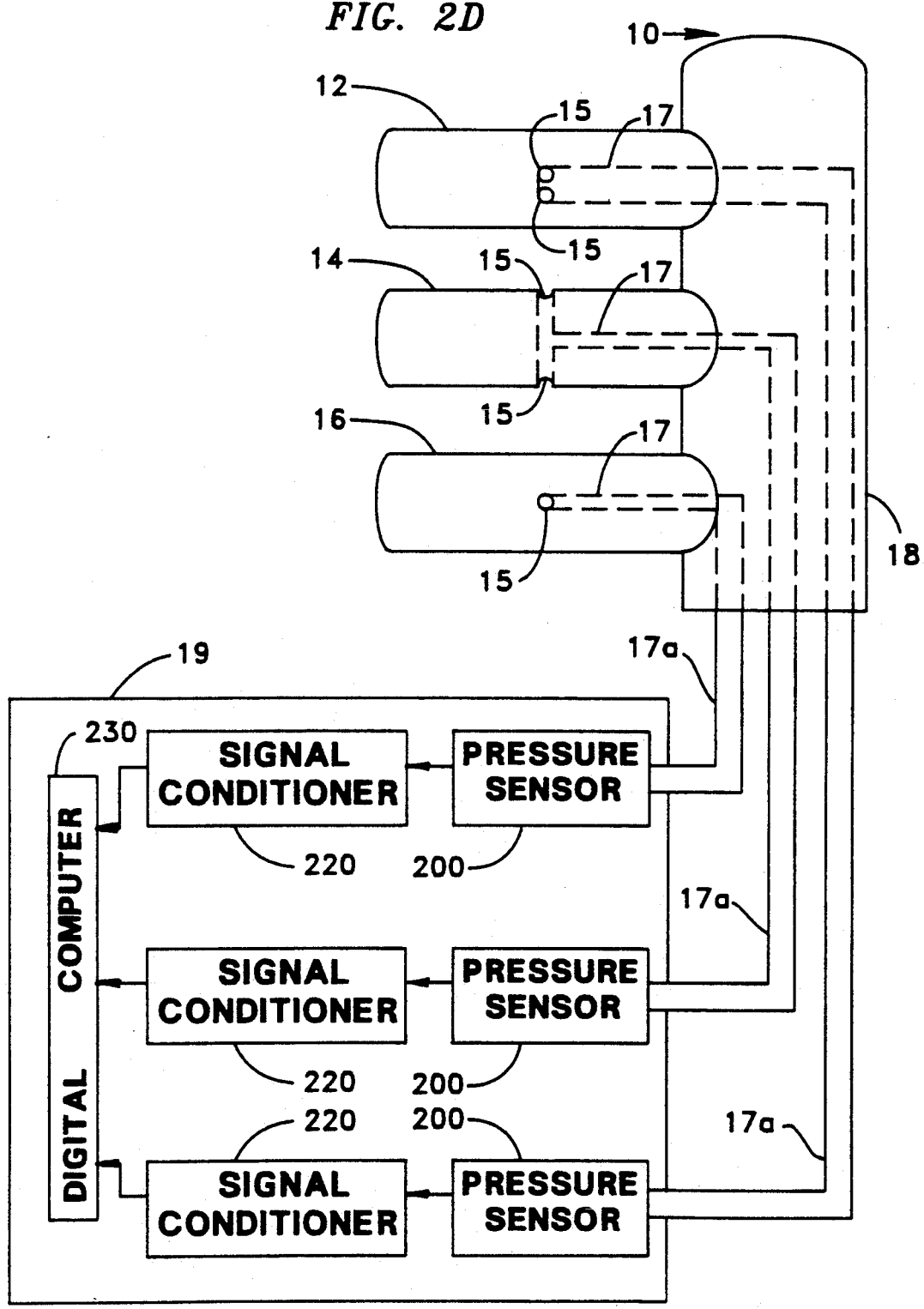
FIG. 2D is a schematic side view of the probe system of FIGS. 2A-2C depicting internal ducts, and a schematic representation of apparatus for sensing pressures with the probe system and processing those sensed pressures.

As schematically illustrated in FIG. 2D, the orifices 15 in each of probes 12, 14, 16 are connected to an airtight duct 17 which passes through the respective probe in a downstream direction. The end of each duct 17 is connected in an airtight manner, such as for example by means of a tube, conduit or duct 17a, to a respective pressure sensor 200, remote from support rod 18, which is part of a processing apparatus 19. Each pressure sensor 200 outputs an analog electrical signal representative of the pressure encountered at orifices 15 to a respective signal conditioner 220, which in turn outputs a conditioned digital electrical signal to a digital computer 230. Each signal conditioner 220 preferably includes an analog-to-digital converter and one or more amplifier(s). The digital computer 230 is programmed with equations set forth herein to provide the static pressure and turbulence intensity measurements. The pressure sensors 200, signal conditioners 220, and digital computer 230 are well known, conventional components, and accordingly need not be described in detail herein.

Figure 2E:
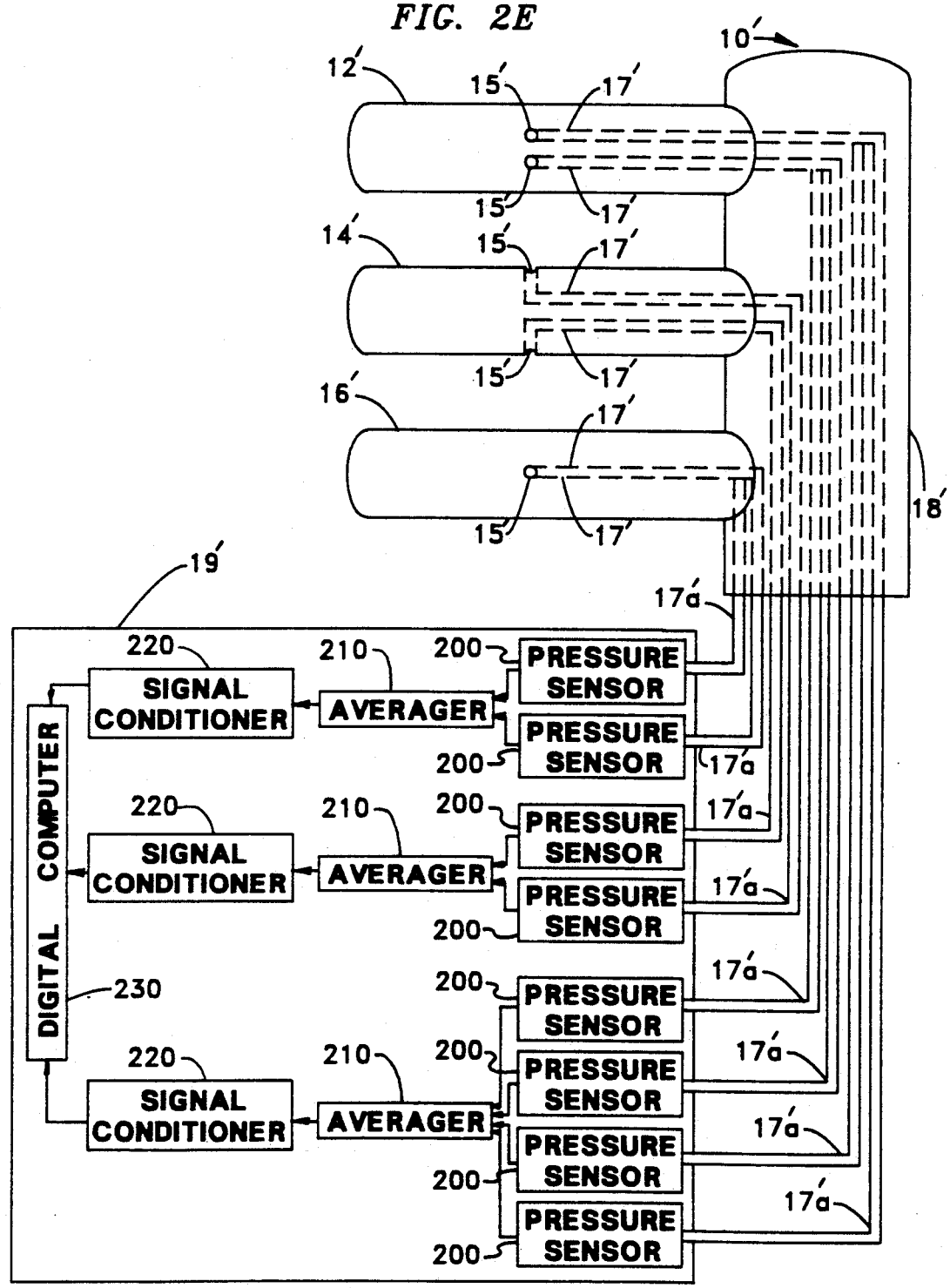
FIG. 2E is an alternative schematic side view of the probe system of FIGS. 2A-2C depicting internal ducts, and an alternative schematic representation of apparatus for sensing pressures with the probe system and processing those sensed pressures.
Figure 3D:
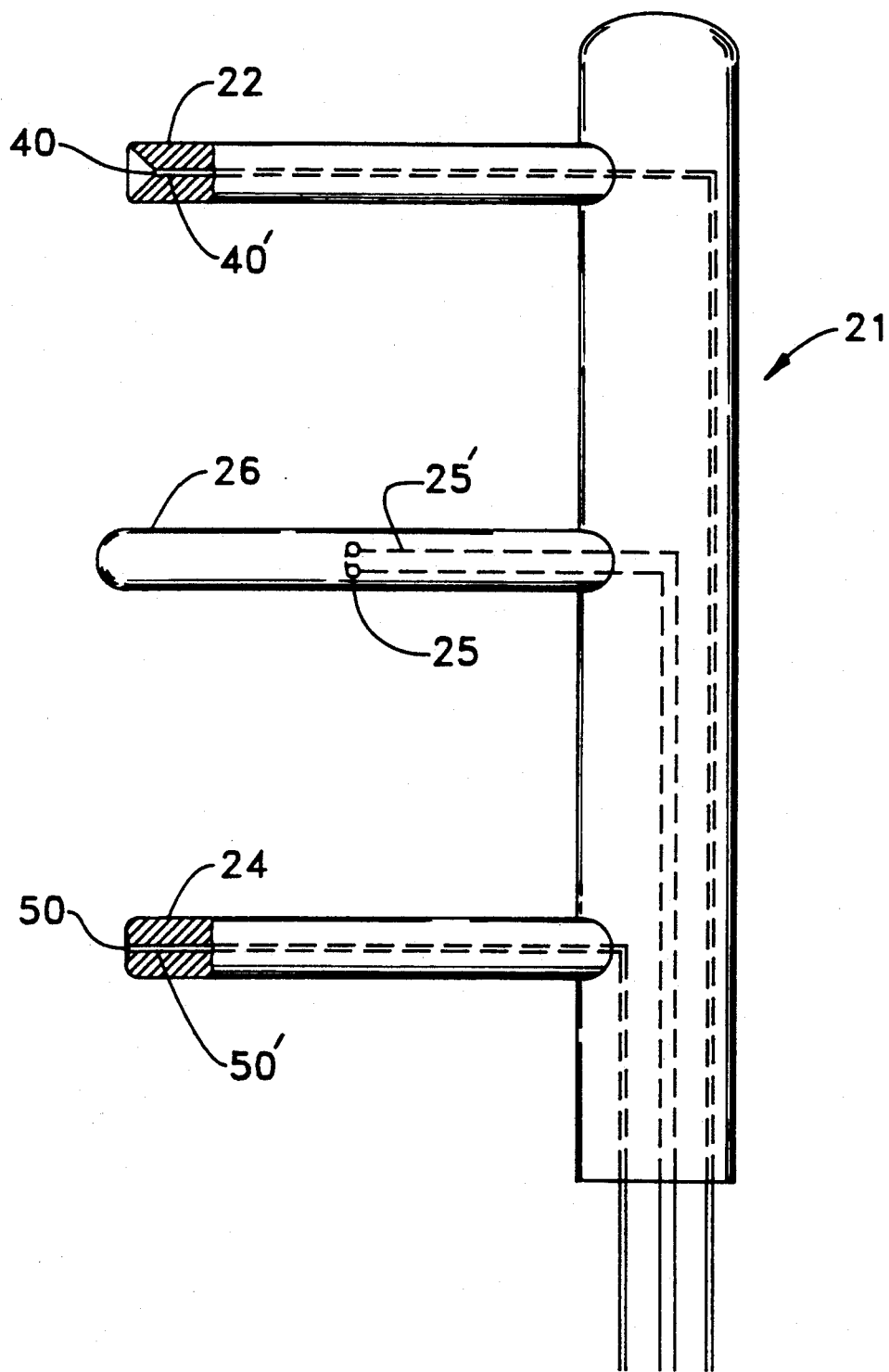
FIG. 3D is a schematic side view of the probe system of FIGS. 3A-3C, depicting internal ducts and nose portions of the two stagnation probes.

Alternatively, as illustrated in FIG. 2E, each probe 12', 14' and 16' of a probe system 10' may include a separate airtight duct 17' connected to each of the respective orifices 15'. Pressure sensors 200, remote from support rod 18' and part of a processing apparatus 19', are respectively connected in an airtight manner to the ducts 17', such as by means of tubes, conduits or ducts 17'a. The analog electrical signals from pressure sensors 200 serving a given probe 12', 14' or 16' are outputted to a respective averager 210, which in turn outputs an averaged analog electrical signal to a respective signal conditioner 220. Each signal conditioner 220 outputs a digital electrical signal to digital computer 230. Signal conditioner 220 preferably includes an analog-to-digital converter and one or more amplifier(s). The digital computer 230 is programmed with equations set forth herein to provide the static pressure and turbulence intensity measurements. The pressure sensors 200, averagers 210, signal conditioners 220, and digital computer 230 are well known, conventional components, and accordingly need not be described in detail herein.

Alternatively, a pressure sensor may be installed in each probe or duct rather than externally. In such an arrangement, the electrical leads from the probes would preferably pass through the interior of support 18, 18' before reaching the signal conditioners. To reduce the number of signal conditioners and pressure sensors, pressure or electrical signal multiplexing can be employed.

The fineness ratio of the ellipse that defines the cross section of the first two probes is arbitrary. The fineness ratio of the elliptical cross sections differs enough from circular so that the solution for the static pressure does not behave in an indeterminate manner. A fineness ratio of about two to four would be expected to bring about a satisfactory solution of the equations for the true time-averaged static pressure.

The third probe in this system is of circular cross section and, as with the other two tubular probes, its axis is also aligned with the time-averaged free-stream direction. This probe has either four, eight or twelve orifices around the cylinder at a given streamwise station so that it responds equally to the velocity components along the two cross-stream axes. Hence, any velocity fluctuations in the cross-stream direction produce a fluctuating pressure signal from this third probe. The time-averaged pressure on the probe provides the additional measurement needed to determine the cross-stream turbulence levels and the time-averaged static pressure. The measured time-averaged pressures at the probe orifices are related to the true time-averaged static pressure in the vicinity of the probe system and to the two cross-stream turbulence intensities using Eqs. (7)–(9).

When Eqs. (7)–(9) are combined to eliminate the cross-stream turbulence intensities, an equation of the time-averaged static pressure in terms of measured quantities is found as $$\frac{\bar{p}}{q} = \frac{\left[\frac{\bar{p}_{orif}}{q}\left(1 - \frac{1}{(1+\epsilon_y)^2} - \frac{1}{(1+\epsilon_z)^2}\right) - \frac{\bar{p}_y}{q(1+\epsilon_y)^2} - \frac{\bar{p}_z}{q(1+\epsilon_z)^2}\right]}{\left[\left(1 - \frac{2}{(1+\epsilon_y)^2} - \frac{2}{(1+\epsilon_z)^2}\right)\right]} \quad (10a)$$

When the same size of elliptical tubing is used for the two probes, which is usually the case, $\epsilon_y = \epsilon_z = \epsilon$, and Eq. (10a) can be simplified and rewritten as $$\frac{\bar{p}}{q} = \frac{\{\bar{p}_y + \bar{p}_z + \bar{p}_{orif}[2 - (1+\epsilon)^2]\}}{\{q[4 - (1+\epsilon)^2]\}} \quad (10b)$$

Although not indicated in Eqs. (10a) and (10b), the pressures are usually measured relative to a reference pressure. It should also be noted that the static pressure becomes singular when the fineness ratio of the elliptical probes approaches one, since all of the time-averaged static pressure measurements become equal if the ellipticity of the probes vanishes, so that all three probes are of circular cross section.

Once the time-averaged static pressure is known, the separate values for the cross-stream turbulence can be found from Eqs. (7) and (8) as $$\frac{\overline{y^2}}{\bar{U}^2} = \frac{2\bar{p} - \bar{p}_{orif} - \bar{p}_y}{q(1+\epsilon_y)^2} \quad (11)$$

Similarly, the expression for turbulence intensity in the z direction is given by $$\frac{\overline{w^2}}{\overline{U}^2} = \frac{2\bar{p} - \bar{p}_{orif} - \bar{p}_z}{q(1 + \epsilon_z)^2} \quad (12)$$

The other component of turbulence intensity, $u^2/\overline{U}^2$, was not found because $\overline{U}$ and $u$ are intimately coupled in any pressure measurement. However, if the fluid mechanisms generating the turbulence are not specifically oriented toward certain components, $u^2/\overline{U}^2$ could be assumed to be equal to $v^2/\overline{U}^2$ or $w^2/\overline{U}^2$ to an average of the two.

FIGS. 2A-2E present an arrangement wherein the circular tube 12 (12') is on top of two probes 14 (14') and 16 (16') of elliptical cross section. In fact, the circular probe 12 (12') could have been placed in the center or on the bottom of the arrangement. Any disposition is acceptable as long as the wakes of the various probes do not pass over a probe near its orifice locations.

FIGS. 3A-3D illustrate a second probe configuration 21 formed by combining total head probes 22 and 24 with a static pressure probe 26 of circular cross section. Probe 26 (of like construction to probe 12 or probe 12' above) has orifices 25 therein connected to an axial duct 25' (or respectively connected to separate axial ducts). Probe 22 has an internally tapered indentation to an orifice 40 (connected to an axial duct 40') such that it has a wide inflow acceptance angle. Probe 22 measures the total average stagnation pressure, $\overline{H}_e$, i.e., the pressure attributable to the probe axis pressure plus the pressure caused by turbulence in the y and z axes. Probe 22 has a flat response to angle of incidence. Probe 24 has n smoothly contoured, shallow, concave indentation to an orifice 50 connected to an axial duct 50'. Probe 24 measures only the streamwise stagnation pressure, $\overline{H}_x$, i.e., the pressure along the x axis. Probe 24 has a cosine-squared response to angle of incidence. Probes 22 and 24 together provide a measurement of cross-stream turbulence, i.e., the total turbulence in the y and z axes.

Pressure is sensed at the orifice locations by a processing system such as system 19 or 19' described above with reference to FIGS. 2D and 2E. Such a three-probe configuration provides a measurement of $\bar{p}_{orif}$, $\overline{H}_e$, and $\overline{H}_x$ so that a determination can be made of $\bar{p}$ by means of Eq. (7) as $$\frac{\bar{p}}{q} = \frac{\bar{p}_{orif} + \overline{H}_e - \overline{H}_x}{q} \quad (13)$$

The combination of the three probes provides an additional set of measurements yielding turbulence intensity, time-averaged static pressure and time-averaged stagnation pressure associated with either the entire fluctuating velocity or with the streamwise component of the velocity alone.

Figure 4C:
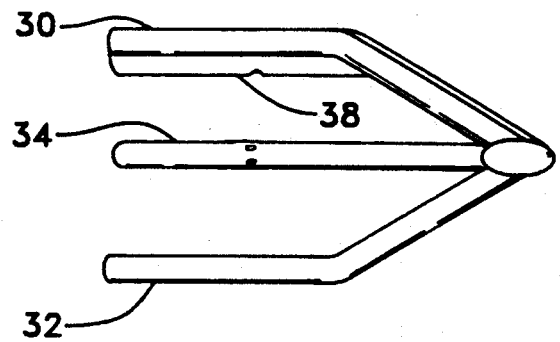
FIGS. 4A, 4B and 4C are front, side and top views, respectively, of a third probe system composed of two tubes of elliptical cross section and three tubes of circular cross section, two of the circular tubes being stagnation probes, for providing redundant measurements of time-averaged static pressure and measurements of cross-stream components of turbulence.
Figure 4A:
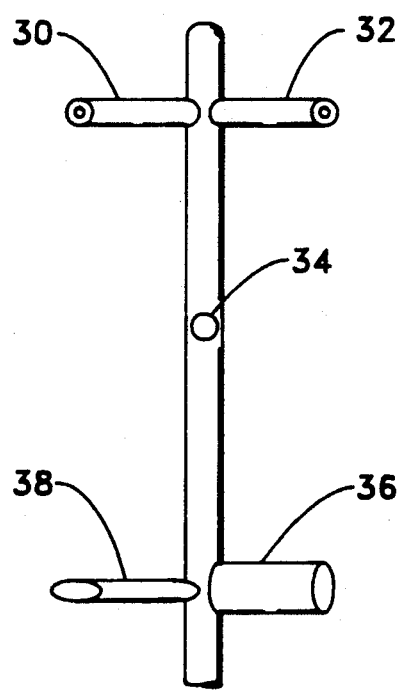
Figure 4B:
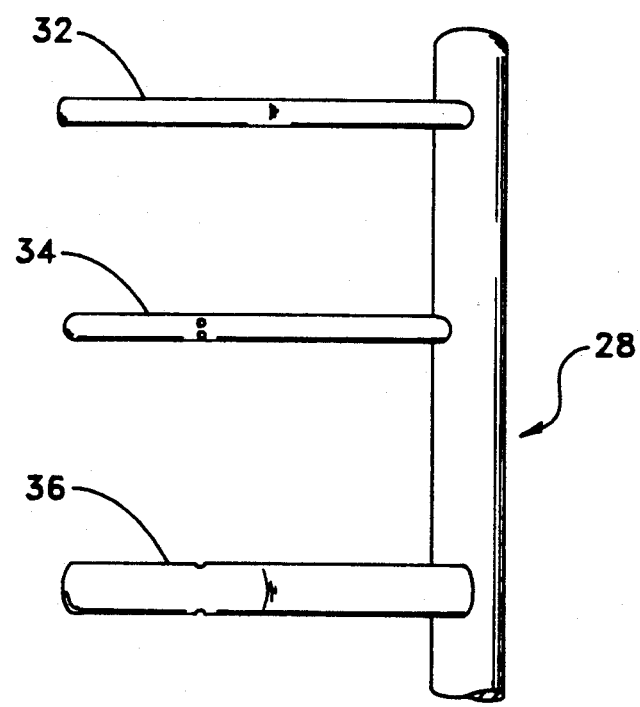

A third embodiment of a probe system of the invention can be assembled by combining the configurations FIGS. 2A-2D or 2E and 3A-3D so that a complete set of measurements is obtained. The probe system 28 so constructed, as illustrated in FIGS. 4A-4C, is comprised of two stagnation probes 30 and 32 (of like construction to probes 22 and 24 above, respectively), a static pressure probe 34 of circular cross section (of like construction to probe 12 or probe 12' above), and two static pressure probes 36 and 38 of elliptical cross section (of like construction to probes 14, 16 or 14', 16' above, respectively). The necessary internal ducts within the probes and support rod have been fully described above with reference to FIGS. 2A-2E and 3A-3D, and that description need not be repeated here.

The time-averaged pressures measured at the various orifices by a processing system such as 19 or 19' described above with respect to FIGS. 2D and 2E can then be used in Eqs. (10)-(13) to determine redundant values for the time-averaged static pressure and the cross-stream turbulence components. As a bonus, the two time-averaged stagnation pressures would also be available. The five-probe system with its sensors is bulkier than the systems 10, 10' and 21, but provides a redundancy which is desirable. Although the configuration shown in FIGS. 4A-4C uses a rectangular system, other arrangements, such as linear or circular, for the various probes are also permissible as long as the flow fields of the various probes do not interfere with one another and they cluster near the point where a measurement is desired. The individual probes could also be inserted into the stream sequentially one probe at a time to completely eliminate the bulk and the probe interference problems. Such a procedure assumes that sufficient test time is available to carry out the measurements and that the repeatability of the flow field is good enough so that it is safe to assume that the various probes are immersed in essentially the same flow field.

While three particular probe systems have been discussed above, any cross-sectional probe shape that amplifies (or suppresses) the velocity (or pressure) at the orifices on its side can be used. An elliptical cross section was used for descriptive purposes because the equations for the velocity are then simple and because tubes of this shape are easily manufactured and readily available. Any alternate shape should have a smoothly rounded cross section without any sharp edges or corners. The arrangement of the various probes in the cluster is fairly arbitrary and certainly not restricted to the ones shown in the figures. However, any arrangement to be used should have the various probes in the assembly located so that they do not interfere with the pressure field of any other probe to a measurable extent and so that they tend to surround and to be near the point where the measurement is desired.

Another embodiment that exploits the non-round cross section of the first two probes in the system is to place the static pressure orifices on the minor axis of the ellipse rather than on the major axis. The contributions of the cross-stream velocity fluctuations are then also amplified by the elliptic cross section, but only by the inverse of the fineness ratio of the elliptical cross section. Such a probe system would complement and perhaps, under some circumstances, actually supplant the original probe system configuration because it responds differently to the velocity fluctuations in the stream.

Simpler probe groups could also be used in accordance with the present invention, but they would not yield enough information to enable determination of all the above-mentioned flow field characteristics.

The probe systems described above have the capability to measure the static pressure and cross-stream turbulence intensities in highly turbulent streams. The designs are based on idealized equations for the flow around the probes. The probe systems provide a means for determining the total and static pressures in a highly turbulent stream using only pressure measuring devices. As such, the installation is simple, inexpensive and easy to operate. The systems provide information needed to make accurate measurements for the time-averaged static pressure, the streamwise velocity, and momentum balances for thrust.

Several advantages of the present invention include convenience, accuracy and the ability to obtain redundant measurements of a quantity that is hard to measure accurately in a turbulent stream, such as static pressure. The only analysis required to obtain pressure measurements with such a probe system is the solution of a simple algebraic equation. The system can be checked out in a wind tunnel to confirm its response to angle of incidence, and no further assumptions should be required as far as the structure of the turbulence and of the flow field are concerned. Furthermore, a complicated analysis is not needed. As a consequence, the probe can be inserted into a turbulent stream and the true time-averaged static pressure can be measured by several different probe combinations. The time-averaged static pressure given by the various probe combinations yields redundant measurements that can be compared with one another to obtain an estimate of the accuracy of the various techniques, and of possible variations in the stream. Hence, the invention provides redundant measurements of the time-averaged static pressure in turbulent streams and of the magnitude of each of the cross-stream turbulence intensities.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A pressure probe system for use in a turbulent fluid stream comprising a plurality of probes, each of said probes having a longitudinal axis and at least one pressure orifice, at least one of said probes having at least one static pressure orifice in a side thereof, at least two of said probes having different shapes, at least one of said probes having a substantially elliptical cross section, and said pressure orifices being disposed at particular locations on said probes such that said probes provide different pressure responses to fluctuations in velocity of the fluid stream in a cross-stream direction when said probes are in the fluid stream, said cross-stream direction being substantially transverse to the longitudinal axis of each probe and means responsive to the different pressures and providing an output which reflects turbulent flow characteristics of the fluid.

2. The system recited in claim 1, wherein at least two of said probes differ in cross section.

3. The system recited in claim 1, comprising at least three said probes.

4. The system recited in claim 3, wherein at least two of said probes have an elliptical cross section.

5. The system recited in claim 4, wherein said probes are located in a cluster relationship.

6. The system recited in claim 1, wherein said probes have longitudinal axes which are parallel to one another.

7. The system recited in claim 1, wherein each of said probes has at least one static pressure orifice connected to an axial duct.

8. The system recited in claim 7, wherein each of said probes has an upstream terminal portion, and said at least one static pressure orifice is located in a side of said each of said probes at least five probe diameters from said upstream terminal portion.

9. The system recited in claim 1, wherein each of said probes has at least two static pressure orifices connected respectively to separate axial ducts.

10. The system recited in claim 1, further comprising a rod which supports said probes.

11. The system recited in claim 10, wherein each of said probes has at least one static pressure orifice located in a side thereof at least ten rod diameters from said rod.

12. The system recited in claim 1, wherein said probes are spaced at least five probe diameters apart from one another.

13. The system recited in claim 1, further comprising means for separately sensing pressure with each of said probes to provide a plurality of sensed pressures.

14. The system recited in claim 13, further comprising means for processing said plurality of sensed pressures to determine a time-averaged static pressure of the fluid stream.

15. The system recited in claim 1, wherein two of said probes have elliptical cross sections and another of said probes has a circular cross section.

16. A method for evaluating a turbulent fluid stream, comprising the steps of:

selecting a plurality of probes each having a longitudinal axis and at least one pressure orifice, said at least one pressure orifice of at least one of said probes being a static pressure orifice located in a side of said at least one probe, at least one of said probes having a substantially elliptical cross section, at least two of said probes having different shapes, and said pressure orifices being disposed at particular locations on said probes such that said probes provide different pressure responses to fluctuations in velocity of the fluid stream in a cross-stream direction when said probes are in the fluid stream, said cross-stream direction being substantially transverse to the longitudinal axis of each probe;

placing said plurality of probes in the fluid stream;

sensing said different pressure responses to cross-stream velocity fluctuations at said at least one orifice on each of said probes to provide a plurality of sensed pressures; and processing said plurality of sensed pressures to provide an output which reflects turbulent flow characteristics of the fluid stream.

17. The method recited in claim 16, wherein at least two of said probes have an elliptical cross section.

18. The method recited in claim 16, wherein two of said probes have elliptical cross sections and another of said probes has a circular cross section.

19. The method recited in claim 16, wherein three said probes are positioned in a clustered relationship in said stream in alignment with a time-averaged direction of said stream, one of said probes being circular in cross section and two of said probes being elliptical in cross section, and time-averaged static pressure is determined in accordance with an equation which eliminates cross-stream turbulence components in the pressure responses of the probes.

20. The method recited in claim 19, wherein said equation is:

$$\bar{p} = \frac{\left[\dfrac{\bar{p}_{orif}}{q}\left(1 - \dfrac{1}{(1+\epsilon_y)^2} - \dfrac{1}{(1+\epsilon_z)^2}\right) - \dfrac{\bar{p}_y}{q(1+\epsilon_y)^2} - \dfrac{\bar{p}_z}{q(1+\epsilon_z)^2}\right]q}{\left[\left(1 - \dfrac{2}{(1+\epsilon_y)^2} - \dfrac{2}{(1+\epsilon_z)^2}\right)\right]}$$

where
- $q$ is dynamic pressure;
- $\bar{p}$ is time-averaged static pressure;
- $\bar{p}_{orif}$ is time-averaged pressure at orifice locations on said probes;
- $\bar{p}_y$ is time-averaged pressure due to velocity along the y axis;
- $\bar{p}_z$ is time-averaged pressure due to velocity along the z axis; and
- $\epsilon_y$ and $\epsilon_z$ are the axis ratios of the probes used to measure components of turbulence in the y and z directions, respectively.

21. The method recited in claim 16, further comprising the step of spacing said probes at least five probe diameters from one another in the fluid stream.

22. The method recited in claim 16, further comprising the step of placing said probes in the fluid stream such that the longitudinal axes of said probes are substantially parallel to one another.

23. The method recited in claim 16, wherein said probes are placed in the stream simultaneously.

24. The method recited in claim 16, wherein said probes are placed in the stream consecutively.

25. A pressure probe system for use in turbulent fluid stream comprising a plurality of probes, each of said probes having a longitudinal axis and at least one pressure orifice, at least one of said probes having at least one static pressure orifice in a side thereof, and at least one other of the probes having an indented pressure orifice in a nose portion thereof, the probe orifices being provided at particular locations on said probes such that said probes provide different pressure responses to fluctuations in velocity of the fluid stream in a cross-stream direction when said probes are in the fluid stream, said cross-stream direction being substantially transverse to the longitudinal axis of each probe, and means responsive to the different pressure responses and providing a measure of at least one of the time-averaged static pressure or turbulence intensity.

26. The system recited in claim 25, wherein at least one of said nose orifices has a sharply tapered configuration.

27. The system recited in claim 25, wherein at least one of said nose orifices has a concave configuration.

28. The system recited in claim 25, wherein at least two of said probes each have an indented pressure orifice in a nose portion thereof, one of said nose orifices having a sharply tapered configuration and another of said nose orifices having a concave configuration.

29. The system recited in claim 25, comprising at least three said probes.

30. The system recited in claim 25, wherein said probes are located in a cluster relationship.

31. The system recited in claim 25, wherein the longitudinal axes of said probes are parallel to one another.

32. The system recited in claim 25, wherein the at least one pressure orifice of each probe is respectively connected to a separate axial duct.

33. The system recited in claim 25, wherein each of said probes has an upstream terminal portion, and said at least one static pressure orifice is located at least five probe diameters from said upstream terminal portion.

34. The system recited in claim 25, further comprising a rod which supports said probes.

35. The system recited in claim 34, wherein said at least one static pressure orifice is located at least ten rod diameters from said rod.

36. The system recited in claim 25, wherein said probes are spaced at least five probe diameters apart from one another.

37. The system recited in claim 25, further comprising means for separately sensing pressure with each of said probes to provide a plurality of sensed pressures.

38. The system recited in claim 37, further comprising means for processing said plurality of sensed pressures to determine a time-averaged static pressure of the fluid stream.

39. A method for evaluating a turbulent fluid stream, comprising the steps of:
selecting a plurality of probes each having a longitudinal axis and at least one pressure orifice, said at least one pressure orifice of at least one of said probes being a static pressure orifice located in a side of said at least one probe, and at least one other of said probes having an indented pressure orifice in a nose portion thereof, the probe orifices being provided at particular locations on said probes such that said probes provide different pressure responses to fluctuations in velocity of the fluid stream in a cross-stream direction when said probes are in the fluid stream, said cross-stream direction being substantially transverse to the longitudinal axis of each probe;
placing said plurality of probes in the fluid stream;
sensing said different pressure responses to cross-stream velocity fluctuations at said at least one orifice on each of said probes to provide a plurality of sensed pressures; and
processing said plurality of sensed pressures to provide an output which reflects turbulent flow characteristics of the fluid stream.

40. The method recited in claim 39, wherein said at least one other of said probes has a sharply tapered indented nose orifice.

41. The method recited in claim 39, wherein said at least one other of said probes has a concave indented nose orifice.

42. The method recited in claim 39, wherein said at least one other of said probes comprises at least two probes each having indented nose orifices, one of said nose orifices having a sharply tapered configuration and another of said nose orifices having a concave configuration.

43. The method recited in claim 39, wherein three said probes are positioned in a clustered relationship in said stream in alignment with a time-averaged direction of said stream, and time-averaged static pressure is determined in accordance with an equation which eliminates cross-stream turbulence components in the pressure responses of the probes.

44. The method recited in claim 43, wherein said equation is:

$$\bar{p} = \dfrac{\left[\dfrac{\bar{p}_{orif}}{q}\left(1 - \dfrac{1}{(1+\epsilon_y)^2} - \dfrac{1}{(1+\epsilon_z)^2}\right) - \dfrac{\bar{p}_y}{q(1+\epsilon_y)^2} - \dfrac{\bar{p}_z}{q(1+\epsilon_z)^2}\right]q}{\left[\left(1 - \dfrac{2}{(1+\epsilon_y)^2} - \dfrac{2}{1+\epsilon_z)^2}\right)\right]}.$$

where
 q is dynamic pressure;
 $\bar{p}$ is time-averaged pressure;
 $\bar{p}_{orif}$ is time-averaged pressure at orifice locations on said probes;
 $\bar{p}_y$ is time-averaged pressure due to velocity along the y axis;
 $\bar{p}_z$ is time-averaged pressure due to velocity along the z axis; and
 $\epsilon_y$ and $\epsilon_z$ are the axis ratios of the probes used to measure components of turbulence in the y and z directions, respectively.

45. The method recited in claim 39, wherein said probes are spaced at least five probe diameters from one another in the fluid stream.

46. The method recited in claim 39, wherein said probes are placed in the fluid stream such that the longitudinal axes of said probes are substantially parallel to one another.

47. The method recited in claim 39, wherein said probes are placed in the stream simultaneously.

48. The method recited in claim 39, wherein said probes are placed in the stream consecutively.

49. The method recited in claim 39, wherein said different pressure responses are y and z values for cross-stream turbulence of the fluid stream determined in accordance with:

$$\dfrac{\bar{v}^2}{\bar{U}^2} = \dfrac{2\bar{p} - \bar{p}_{orif} - \bar{p}_y}{q(1+\epsilon_y)^2};$$

$$\dfrac{\bar{w}^2}{\bar{U}^2} = \dfrac{2\bar{p} - \bar{p}_{orif} - \bar{p}_z}{q(1+\epsilon_z)^2}.$$

where
 $\bar{v}$ is time-averaged velocity in the y direction;
 $\bar{w}$ is time-averaged velocity in the z direction;
 $\bar{U}$ is time-averaged velocity in the stream direction;
 $\bar{p}$ is time-averaged static pressure;
 $\bar{p}_{orif}$ is time-averaged pressure at orifice locations on said probes;
 $\bar{p}_y$ is time-averaged pressure due to velocity along the y axis;
 $\bar{p}_z$ is time-averaged pressure due to velocity along the z axis;
 q is dynamic pressure;
 $\epsilon_y$ is the axis ratio of the probe used to measure a component of turbulence in the y direction; and
 $\epsilon_z$ is the axis ratio of the probe used to measure a component of turbulence in the z direction.

50. The method recited in claim 16, wherein said different pressure responses are y and z values for cross-stream turbulence of the fluid stream determined in accordance with:

$$\dfrac{\bar{v}^2}{\bar{U}^2} = \dfrac{2\bar{p} - \bar{p}_{orif} - \bar{p}_y}{q(1+\epsilon_y)^2};$$

and $$\dfrac{\bar{w}^2}{\bar{U}^2} = \dfrac{2\bar{p} - \bar{p}_{orif} - \bar{p}_z}{q(1+\epsilon_z)^2}$$

where
 $\bar{v}$ is time-averaged velocity in the y direction;
 $\bar{w}$ is time-averaged velocity in the z direction;
 $\bar{U}$ is time-averaged velocity in the stream direction;
 $\bar{p}$ is time-averaged static pressure;
 $\bar{p}_{orif}$ is time-averaged pressure at orifice locations on said probes;
 $\bar{p}_y$ is time-averaged pressure due to velocity along the y axis;
 $\bar{p}_z$ is time-averaged pressure due to velocity along the z axis;
 q is dynamic pressure;
 $\epsilon_y$ is the axis ratio or the probe used to measure a component of turbulence in the y direction; and
 $\epsilon_z$ is the axis ratio of the probe used to measure a component of turbulence in the z direction.

* * * * *